(12) United States Patent
Chen

(10) Patent No.: US 6,186,919 B1
(45) Date of Patent: Feb. 13, 2001

(54) CHAIN COVER FOR AN EXERCISE PEDAL ASSEMBLY

(76) Inventor: Ping Chen, No. 29, Nan-Mei Street, Taichung City (TW)

( * ) Notice: Under 35 U.S.C. 154(b), the term of this patent shall be extended for 0 days.

(21) Appl. No.: 09/259,825

(22) Filed: Mar. 1, 1999

(51) Int. Cl.[7] .................................................. B62J 13/04
(52) U.S. Cl. ............................................................ 474/146
(58) Field of Search ................................... 474/144, 146; 74/608, 609

(56) References Cited

U.S. PATENT DOCUMENTS

| Re. 34,478 | * | 12/1993 | Dalebout et al. | 482/59 |
| 678,377 | * | 7/1901 | Cox | 74/609 |
| 1,074,947 | * | 10/1913 | Heath | 474/146 X |
| 1,453,673 | * | 5/1923 | Hebert | 474/146 X |
| 3,667,318 | * | 6/1972 | Lock | 74/609 |
| 3,710,646 | * | 1/1973 | Bogan | 74/609 |
| 5,312,303 | * | 5/1994 | Hinschlager | 474/144 |

* cited by examiner

Primary Examiner—Charles A Marmor
Assistant Examiner—Ha Ho

(74) Attorney, Agent, or Firm—Ladas & Parry

(57) ABSTRACT

A chain cover includes t and rear casing parts connected detachably to one another. The front casing part has a first top wall, a bottom wall and two opposing first side walls with first side ends. The first top wall has a U-shaped first top end. The bottom wall has a U-shaped first bottom end. The rear casing part has a second top wall, two opposing second side walls with second side ends and a U-shaped second bottom end. The second top wall has a second top end. The first and second side ends extend straightaway in a downward direction. The first top wall and the first side walls are provided with first rail members. The second top wall and the second side walls are provided with second rail members. The first and second rail members on the first and second top walls are interlocked with one another to prevent the rear casing part from disengaging rearwardly from the front casing part when the front and rear casing parts are connected to one another. The first and second rail members on the first and second side walls interconnect slidably the first and second side ends and permit the second side ends to slide over the first side ends in a downward direction from the first top end when the front and rear casing parts are connected to one another.

8 Claims, 6 Drawing Sheets

CHAIN COVER FOR AN EXERCISE PEDAL ASSEMBLY

BACKGROUND OF THE INVENTION

1. Field of the Invention

This invention relates to a chain cover for a pedal exerciser, more particularly to a chain cover including a casing body having a front casing part and a rear casing part that can be assembled easily to the front casing part.

2. Description of the Related Art

In a conventional chain cover for an exercise pedal assembly, a casing body includes a front casing part with a rear opening, and a rear casing part that is connected detachably to the front casing part to close the rear opening. However, the rear casing part is difficult to assemble onto the front casing part due to the lack of guiding means on the adjoining edges of the front and rear casing parts.

SUMMARY OF THE INVENTION

The object of the present invention is to provide a chain cover for an exercise pedal assembly including a casing body with front and rear casing parts that can be easily and quickly assembled together.

According to the present invention, the chain cover for an exercise pedal assembly comprises a casing body having a front casing part with a rear opening, and a rear casing part that is connected detachably to the front casing part to close the rear opening. The front casing part has a first top wall, a bottom wall and two opposing first side walls interconnecting the first top wall and the bottom wall. The first top wall has a first top end. The first side walls have opposing first side ends which extend downwardly from the first top end. The bottom wall has a U-shaped first bottom end with two opposing portions which extend respectively and rearwardly from the first side ends and which merge with one another after turning toward one another. The rear opening is defined by the first top end, the first side ends and the first bottom end. The rear casing part has a second top wall, two opposing second side walls extending downwardly from the second top wall, and a rear wall connected to the second top wall and the second side walls. The second top wall has a second top end opposite to the rear wall. The second side walls have opposing second side ends that extend downwardly from the second top end. The second side walls and the rear wall cooperatively form a U-shaped second bottom end. The U-shaped second bottom end has two opposing portions which extend respectively and rearwardly from the second side ends to the rear wall. The first and second side ends extend straightaway in a downward direction. The first top wall and the first side walls are provided with first rail members. The second top wall and the second side walls are provided with second rail members. The first and second rail members on the first and second top walls are interlocked with one another to prevent the rear casing part from disengaging rearwardly from the front casing part when the front and rear casing parts are connected to one another. The first and second rail members on the first and second side walls interconnect slidably the first and second side ends and permit the second side ends to slide over the first side ends in a downward direction from the first top end when the front and rear casing parts are connected to one another.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
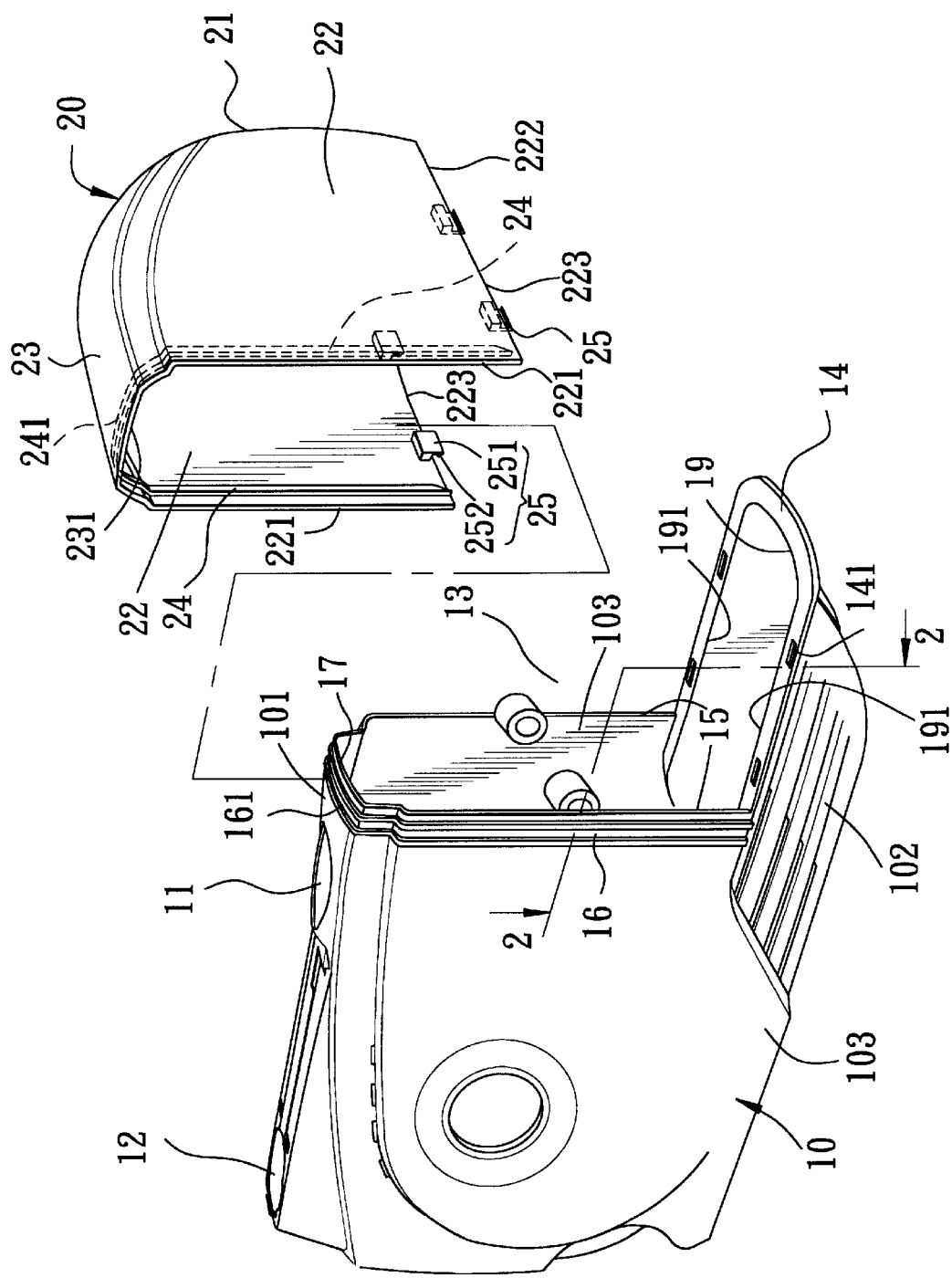
FIG. 1 is an exploded view of a first preferred embodiment of a chain cover for an exercise pedal assembly according to the present invention.

Referring to FIG. 1, a first preferred embodiment. of a chain cover according to the present invention is shown to comprise a casing body having a front casing parts 10 with a rear opening 13, and a rear casing part 20 that is connected detachably to the front casing part 10 to close the rear opening 13.

The front casing part 10 is generally oval in shape, and encloses an exercise pedal assembly (not shown) therein. The top portion of the casing body has two circular holes 11, 12 through which seat and head tubes (not shown) extend, respectively. The front casing part 10 has a first top wall 101, a bottom wall 102 and two opposing first side walls 103 interconnecting the first top wall 101 and the bottom wall 102. The first top wall 101 has a first top end 17. The first side walls 103 have opposing first side ends 15 which extend downwardly from the first top end 17. The bottom wall 102 has a U-shaped first bottom end 19 with two opposing portions 191 which extend respectively and rearwardly from the first side ends 15 and which merge with one another after turning toward one another. The rear opening 13 is defined by the first top end 17, the first side ends 15 and the first bottom end 19.

Figure 2:
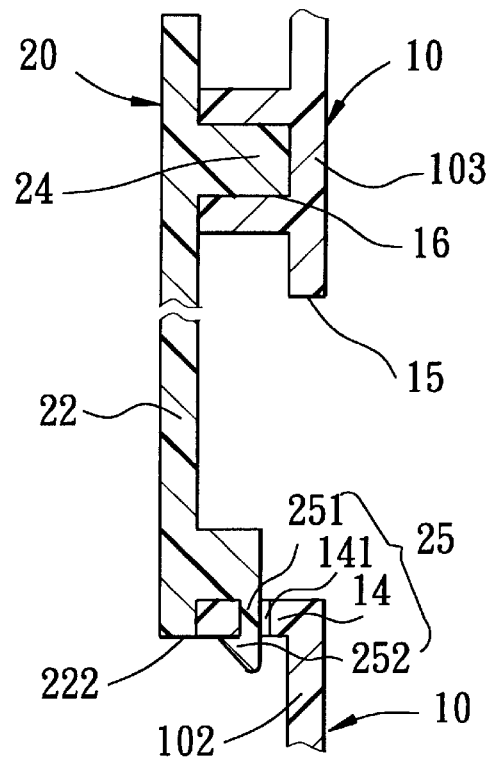
FIG. 2 is an enlarged, fragmentary crosssectional view taken along line 2—2 of FIG. 1 when the chain cover is in an assembled state.

The rear casing part 20 has a second top wall 23, two opposing second side walls 22 extending downwardly from the second top wall 23, and a rear wall 21 connected to the second top wall 23 and the second side walls 22. The second top wall 23 has a second top end 231 opposite to the rear wall 21. The second side walls 22 have opposing second side ends 221 that extend downwardly from the second top end 231. The second side walls 22 and the rear wall 21 cooperatively form a U-shaped second bottom end 222. The U-shaped second bottom end 222 has two opposing portions 223 which extend respectively and rearwardly from the second side ends 221 to the rear wall 21. The first and second side ends 15, 221 extend straightaway in a downward direction. The first top wall 101 and the first side walls 103 are provided with first rail members 161, 16. The second top wall 23 and the second side walls 22 are provided with second rail members 241, 24. The first and second rail members 161, 241 on the first and second top walls 101, 23 are interlocked with one another to prevent the rear casing part 20 from disengaging rearwardly from the front casing part 10 when the front and rear casing parts 10, 20 are connected to one another. The first and second rail members 16, 24 on the first and second side walls 103, 22 interconnect slidably the first and second side ends 15, 221 and permit the second side ends 221 to slide over the first side ends 15 in a downward direction from the first top end 17 when the front and rear casing parts 10, 20 are connected to one another, as best illustrated in FIG. 2. It noted that the rear casing part 20 can be mounted easily and quickly on the front casing part 10 in the downward direction by virtue of the guiding effect of the first and second rail members 16, 24 on the first and second side walls 103, 22. In addition, the rear casing part 20 can engage positively the front casing part 10 by means of the first and second rail members 161, 241 on the first and second top walls 101, 23.

In this embodiment, the first rail members include grooved rails 161, 16 formed respectively on an upper face of the first top wall 101 adjacent to the first top end 17 and on an outer face of the first side walls 103 adjacent to the first side ends 15. The second rail members include slide rails 241, 24 formed respectively on a lower face of the second top wall 23 adjacent to the second top end 231 and on an inner face of the second side walls 22 adjacent to the second side ends 221. The first top end 17 is flush with the first side ends 15 in a plane parallel to the downward direction. The first rail members 161, 16 extend in full length of the first top end 17 and the first side ends 15. The second rail members 241, 24 extend in full length of the second top end 23 and the second side ends 221.

Referring to FIGS. 1 and 2, the first bottom end has a U-shaped flat face 14 extending in a plane transverse to a line parallel to the downward direction. The flat face 14 has a first positioning unit 141 formed thereon. The second bottom end 222 has a second positioning unit 25 that is interlocked with the first positioning unit 141. Specifically, the first positioning unit has a plurality of engaging slots 141 formed in the flat face 14. The second positioning unit 25 has a plurality of downwardly projecting tongues 251 with barbed ends 252. The second bottom end 222 rests on the flat face 14, and the barbed ends 252 of the tongues 251 engage releaseably the engaging slots 141 when the front and rear casing parts 10, 20 are connected to one another. In this way, the front and rear casing parts 10, 20 can be fastened firmly together.

Figure 4:
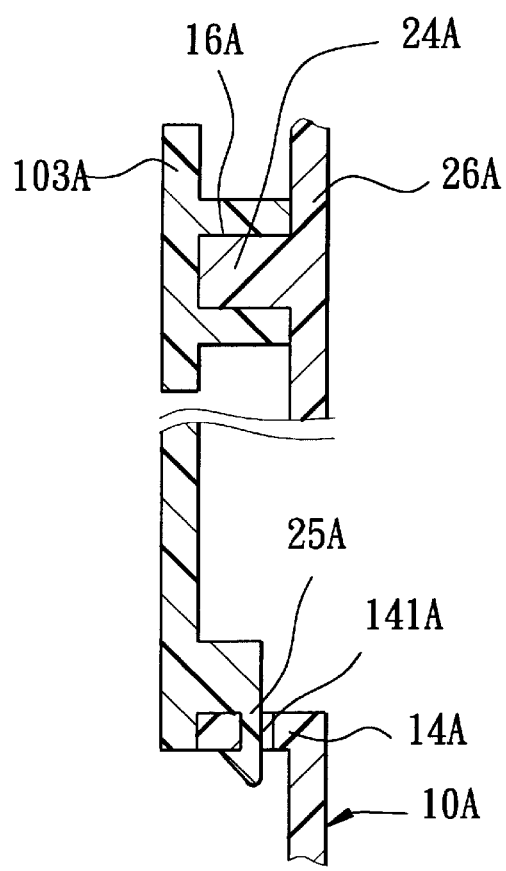
FIG. 4 is an enlarged, fragmentary crosssectional view taken along line 4—4 of FIG. 3 when the chain cover is in an assembled state.
Figure 3:
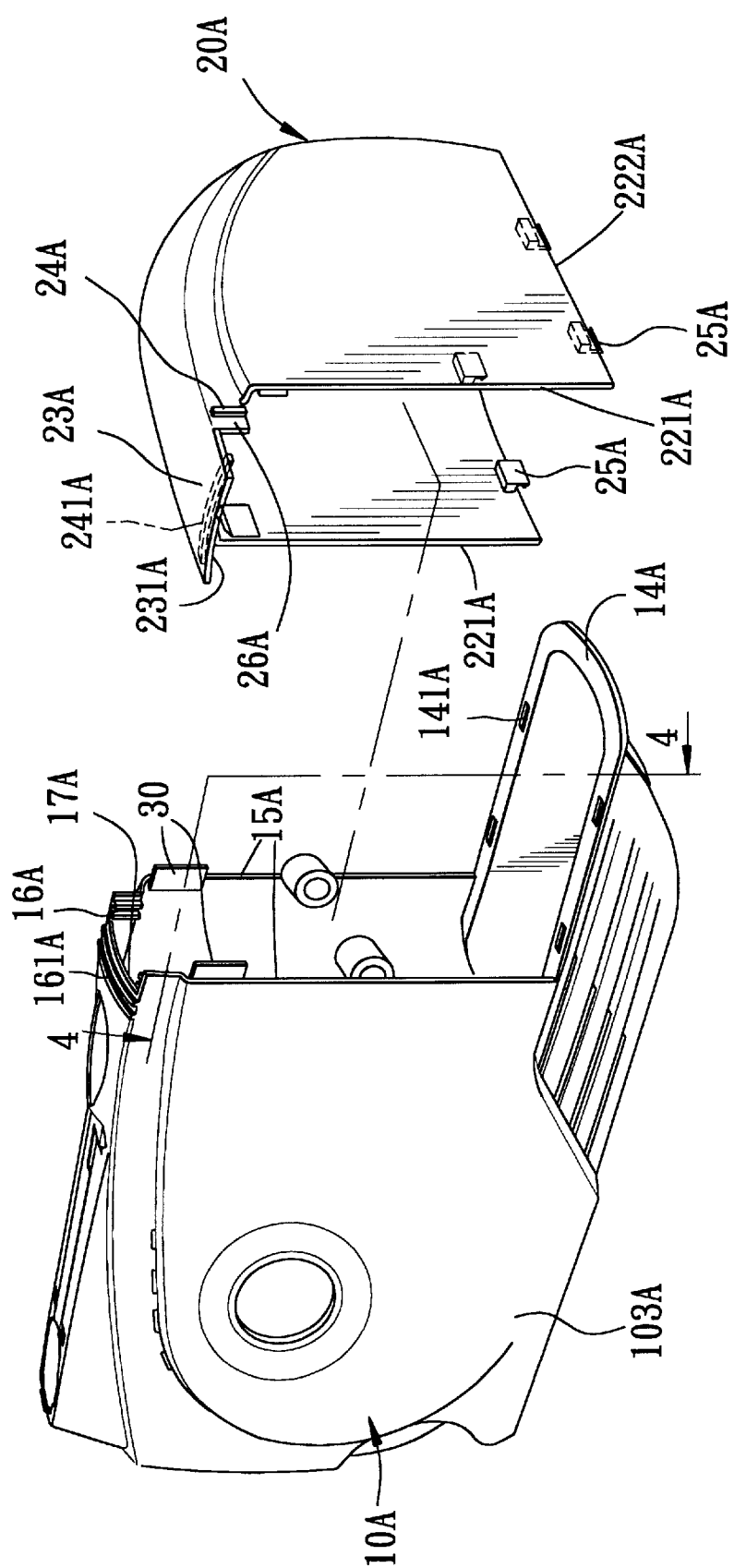
FIG. 3 is an exploded view of a second preferred embodiment of a chain cover for an exercise pedal assembly according to the present invention.

Referring to FIGS. 3 and 4, a second preferred embodiment of a chain cover according to the present invention is shown to comprise a front casing part (10A) and a rear casing part (20A). In this embodiment, the first top end (17A) extends between the first side walls (103A) forwardly of the first side ends (15A) The second top wall (23A) projects forwardly of the second side ends (221A). Two opposing plate members (26A) (only one is shown in the drawings) extend forwardly of the second side ends (221A) and downwardly of the second top wall (23A). The first rail members include two first grooved rails (16A) formed on opposed inner faces of the first side walls (103A) and a second grooved rail (161A) formed on the first top end (17A). The second rail members include two first slide rails (24A) (only one is shown in the drawings) formed on outer faces of the plate members (26A) and a second slide rail (241A) formed at a lower face of the second top wall (23A) adjacent to the second top end (231A). The first grooved rails (16A) engage the first slide rails (24A), and the second grooved rail (161A) engage the second slide rail (241A) in a manner similar to that in the first embodiment when the front and rear casing parts (10A, 20A) are connected to one another. Further, two guide members 30 project rearwardly from the first side ends (15A) to facilitate the assembly of the front and rear casing parts (10A, 20A) when the second side ends (221A) slide downwardly over the first side ends (15A). The second bottom end (222A) of the rear casing part (20A) has a second positioning unit (25A) that engages the first positioning unit (141A) in the flat face (14A) in a manner similar to that in the first embodiment.

Figure 5:
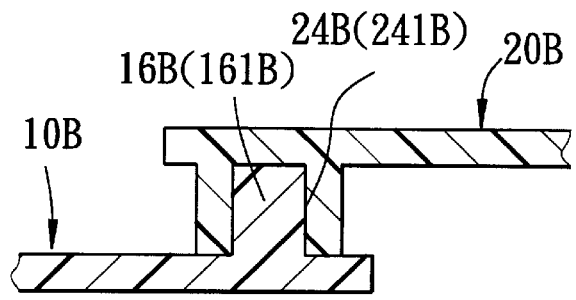
FIG. 5 is an enlarged, fragmentary crosssectional view illustrating the rail members of a third preferred embodiment of a chain cover according to the present invention.

Referring to FIG. 5, a third preferred embodiment of a chain cover according to the present invention is shown to comprise a front casing part (10B) and a rear casing part (20B). In this embodiment, the first rail members are formed as slide rails (16B, 161B) while the second rail members are formed as grooved rails (24B, 241B) that are interlocked complementarily with the slide rails (16B, 161B). With these structures, the same effects as in the first embodiment can be achieved.

Figure 6:
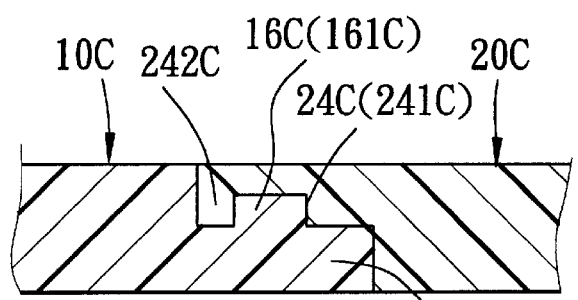
FIG. 6 in enlarged, fragmentary crosssectional view illustrating the rail members of a fourth preferred embodiment of a chain cover according to the present invention.

Referring to FIG. 6, a fourth preferred embodiment of a chain cover according to the present invention is shown to comprise a front casing part (10C) and a rear casing part (20C). In this embodiment, the first rail members include slide rails (16C, 161C) provided on rearwardly extending end flanges (162C) that are formed on the front casing part (10C) and that have a thickness smaller than that of the front casing part (10C). The second rails members include grooved rails (24C, 241C) provided on forwardly extending end flanges (242C) that are formed on the rear casing part (20C) and that have a thickness smaller than that of the rear casing part (20C). With these structures, the same effects as in the first embodiment can be achieved.

Figure 7:
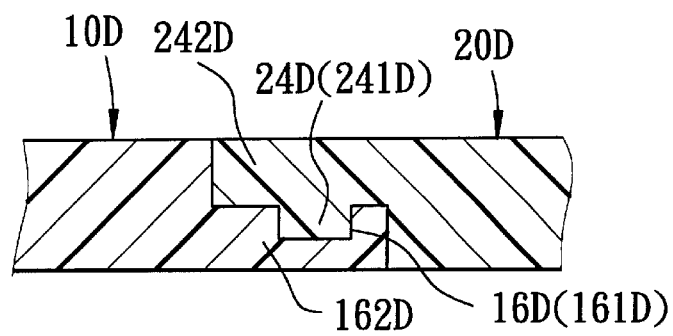
FIG. 7 is an enlarged, fragmentary crosssectional view illustrating the rail members of a fifth preferred embodiment of a chain cover according to the present invention.

Referring to FIG. 7, a fifth preferred embodiment of a chain cover according to the present invention is shown to comprise a front casing part (10D) and a rear casing part (20D). In this embodiment, the first rail members include grooved rails (16D, 161D) provided on rearwardly extending end flanges (162D) that are formed on the front casing part (10D) and that have a thickness smaller than that of the front casing part (10D). The second rails members include slide rails (24D, 241D) provided on forwardly extending end flanges (242D) that are formed on the rear casing part (20D) and that have a thickness smaller than that of the rear casing part (20D). With these structures, the same effects as in the first embodiment can be achieved.

Figure 8:
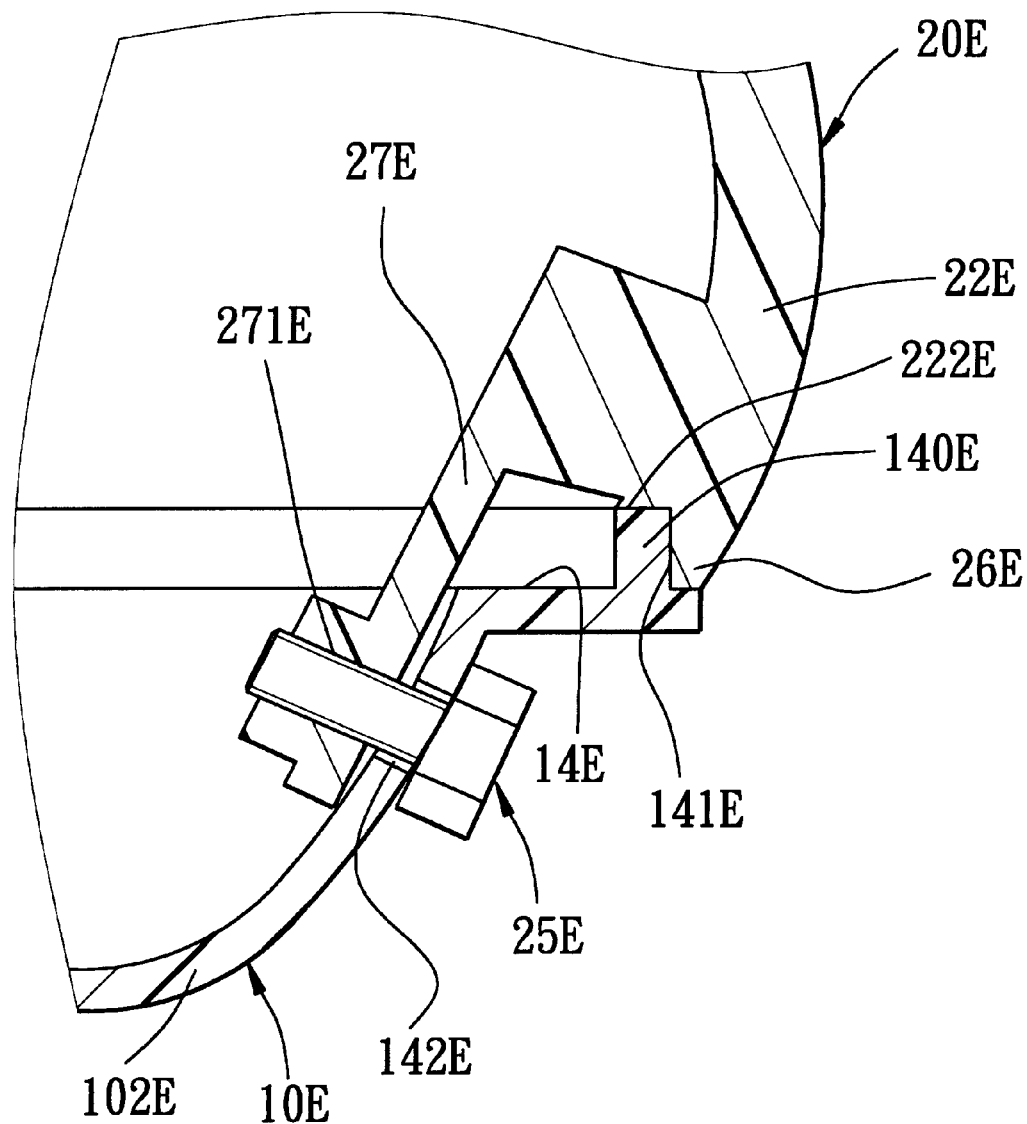
FIG. 8 is an enlarged, fragmentary crosssectional view illustrating the positioning units of a sixth preferred embodiment of a chain cover according to the present invention.

Referring to FIG. 8, a sixth preferred embodiment of a chain cover according to the present invention is shown to comprise a front casing part (10E) and a rear casing part (20E). In this embodiment, the first positioning unit includes an upwardly extending flange (140E) formed on the flat face (14E) to form a shoulder (141E) on the flat face (14E), and a through hole (142E) formed in the bottom wall (102E) of the front casing part (10E). The second positioning unit includes a downwardly extending flange (26E) formed on the second bottom end (222E), and an inclined plate (27E) extending downwardly from an inner face of one of the second side walls (22E). The inclined plate (27E) has a threaded hole (271E) formed therein. The downwardly extending flange (26E) abuts against the shoulder (141E) on the flat face (14E) while the threaded hole (271E) of the inclined plate (27E) is aligned with the through hole (142E) in the bottom wall (102E) of the front casing part (10E)

when the front and rear casing parts (10E, 20E) are connected to one another. A locking bolt (25E) extends through the through hole (142E) and engages threadedly the threaded hole (271B) in order to secure the second side walls (22E) of the rear casing part (20E) to the bottom wall (102E) of the front casing part (10E).

Figure 9:
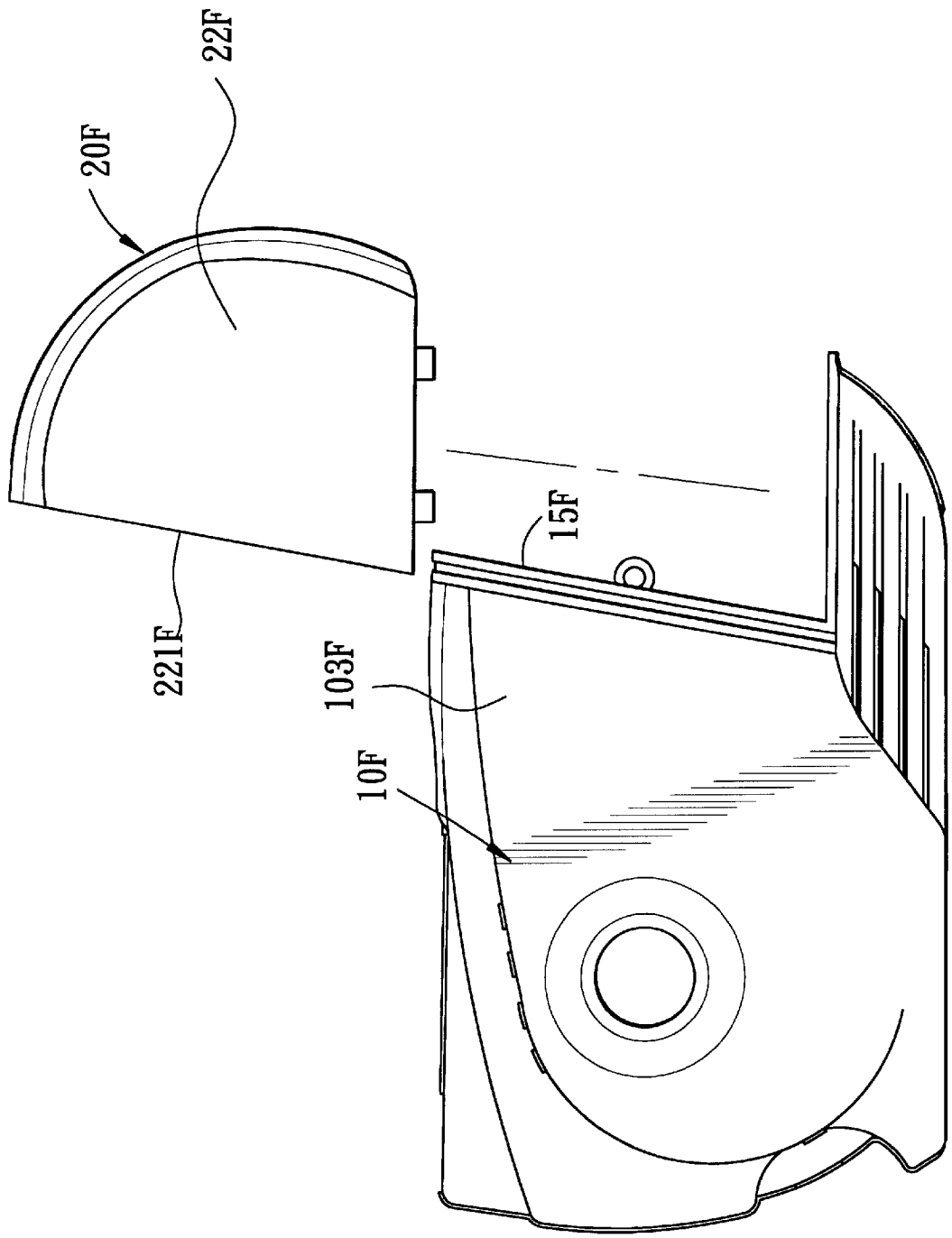
FIG. 9 is an exploded view of a seventh preferred embodiment of a chain cover according to the present invention.

Referring to FIG. 9, a seventh preferred embodiment of a chain cover according to the present invention is shown to comprise a front casing part (10F) and a rear casing part (20F). The first side ends (15F) of the first side walls (103F) of the front casing part (10F) incline downwardly. The second side ends (221F) of the second side walls (22F) of the front casing part (20F) also incline downwardly to mate with the first side ends (15). Therefore, the rear casing part (20F) can be assembled onto the front casing part (10F) in a downward and inclined direction.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A chain cover for an exercise pedal assembly comprising a casing body having a front casing part with a rear opening, and a rear casing part that is connected detachably to said front casing part to close said rear opening, said front casing part having a first top wall, a bottom wall and two opposing first side walls interconnecting said first top wall and said bottom wall, said first top wall having a first top end, said first side walls having opposing first side ends which extend downwardly from said first top end, said bottom wall having a U-shaped first bottom end with two opposing portions which extend respectively and rearwardly from said first side ends and which merge with one another after turning toward one another, said rear opening being defined by said first top end, said first side ends and said first bottom end, said rear casing part having a second top wall, two opposing second side walls extending downwardly from said second top wall, and a rear wall connected to said second top wall and said second side walls, said second top wall having a second top end opposite to said rear wall, said second side walls having opposing second side ends that extend downwardly from said second top end, said second side walls and said rear wall cooperatively forming a U-shaped second bottom end, said U-shaped second bottom end having two opposing portions which extend respectively and rearwardly from said second side ends to said rear wall, said first and second side ends extending straightaway in a downward direction, said first top wall and said first side walls being provided with first rail members, said second top wall and said second side walls being provided with second rail members, said first and second rail members on said first and second top walls being interlocked with one another to prevent said rear casing part from disengaging rearwardly from said front casing part when said front and rear casing parts are connected to one another, said first and second rail members on said first and second side walls interconnecting slidably said first and second side ends and permitting said second side ends to slide over said first side ends in a downward direction from said first top end when said front and rear casing parts are connected to one another.

2. The chain cover as claimed in claim 1, wherein said first rail members include grooved rails formed respectively on said first top wall adjacent to said first top end and on said first side walls adjacent to said first side ends, and said second rail members include slide rails formed respectively on said second top wall adjacent to said second top end and on said second side walls adjacent to said second side ends.

3. The chain cover as claimed in claim 2, wherein said first top end is flush with said first side ends in a plane parallel to said downward direction, said first rail members extending in full length of said first top end and said first side ends, said second rail members extending in full length of said second top end and said second side ends.

4. The chain cover as claimed in claim 1, wherein said first top end extends between said first side walls forwardly of said first side ends, said second top wall projecting forwardly of said second side ends, said rear casing part further having two opposing plate members that extend forwardly of said second side ends and downwardly of said second top wall, said first rail members including two first grooved rails formed on opposed inner faces of said first side walls and a second grooved rail formed on said first top end, said second rail members including two first slide rails formed on outer faces of said plate members and a second slide rail formed at a lower face of said second top wall adjacent to said second top end, said first grooved rails engaging said first slide rails and said second grooved rail engaging said second slide rail when said front and rear casing parts are connected to one another.

5. The chain cover as claimed in claim 2, wherein said first bottom end has a U-shaped flat face extending in a plane transverse to a line parallel to said downward direction, said flat face having a first positioning unit formed thereon, said second bottom end having a second positioning unit that is lockable with said first positioning unit.

6. The chain cover as claimed in claim 5, wherein said first positioning unit includes a plurality of engaging slots formed in said flat face, said second positioning unit including a plurality of downwardly projecting tongues with barbed ends, said second bottom end resting on said flat face and said barbed ends of said tongues engaging releaseably said engaging slots when said front and rear casing parts are connected to one another.

7. The chain cover as claimed in claim 5, wherein said first positioning unit includes an upwardly extending flange formed on said flat face to form a shoulder on said flat face, and a through hole formed in said bottom wall, said second positioning unit including a downwardly extending flange formed on said second bottom end and an inclined plate extending downwardly from an inner face of one of said second side walls, said inclined plate having a threaded hole formed therein, said downwardly extending flange abutting against said shoulder on said flat face while said threaded hole of said inclined plate is aligned with said through hole in said bottom wall of said front casing part when said front and rear casing parts are connected to one another, said chain cover further comprising a locking bolt extending through said through hole and engaging threadedly said threaded hole in order to secure said second side walls of said rear casing part to said bottom wall of said front casing part.

8. The chain cover as claimed in claim 1, wherein said first side ends further have guide members which extend from inner surfaces of said first side walls and which project rearwardly from said first side ends.

* * * * *